(12) United States Patent
Yeh et al.

(10) Patent No.: US 8,300,030 B2
(45) Date of Patent: Oct. 30, 2012

(54) TABLET AND COORDINATE COMPUTATION CIRCUIT THEREOF

(75) Inventors: Chia-Jui Yeh, Taipei (TW); Yun-Hsiang Yeh, Hsinchu (TW)

(73) Assignee: Waltop International Corporation, Hsinchu (TW)

( * ) Notice: Subject to any disclaimer, the term of this patent is extended or adjusted under 35 U.S.C. 154(b) by 745 days.

(21) Appl. No.: 12/423,913

(22) Filed: Apr. 15, 2009

(65) Prior Publication Data

US 2010/0207893 A1    Aug. 19, 2010

(30) Foreign Application Priority Data

Feb. 16, 2009   (CN) .......................... 2009 1 0009518

(51) Int. Cl.
*G06F 3/033* (2006.01)

(52) U.S. Cl. .................. 345/179; 178/18.01; 178/18.07; 345/173

(58) Field of Classification Search .......... 345/173–179; 178/18.03, 18.07, 19.01, 19.06, 19.07, 20.01–20.04
See application file for complete search history.

(56) References Cited

U.S. PATENT DOCUMENTS

| | | | | |
|---|---|---|---|---|
| 4,717,793 A | * | 1/1988 | Kobayashi | 178/20.02 |
| 4,786,765 A | * | 11/1988 | Yamanami et al. | 178/19.06 |
| 4,848,496 A | * | 7/1989 | Murakami et al. | 178/18.07 |
| 4,878,553 A | * | 11/1989 | Yamanami et al. | 178/18.07 |
| 4,948,926 A | * | 8/1990 | Murakami et al. | 178/18.07 |
| 5,134,689 A | * | 7/1992 | Murakami et al. | 345/443 |
| 5,675,130 A | * | 10/1997 | Sekizawa | 178/18.07 |
| 5,714,720 A | * | 2/1998 | Landmeier | 178/19.03 |
| 6,636,184 B1 | * | 10/2003 | Yeh | 343/867 |
| 6,744,426 B1 | * | 6/2004 | Okamoto et al. | 345/179 |
| 6,784,876 B1 | * | 8/2004 | Nagai et al. | 345/178 |
| 6,801,192 B2 | * | 10/2004 | Fujitsuka et al. | 345/179 |
| 7,656,390 B2 | * | 2/2010 | Oda | 345/173 |
| 2002/0041272 A1 | * | 4/2002 | Ohashi | 345/173 |
| 2008/0257613 A1 | * | 10/2008 | Katsurahira | 178/19.04 |
| 2010/0206644 A1 | * | 8/2010 | Yeh | 178/18.07 |

* cited by examiner

*Primary Examiner* — Amare Mengistu
*Assistant Examiner* — Dmitriy Bolotin
(74) *Attorney, Agent, or Firm* — Huffman Law Group, P.C.

(57) ABSTRACT

The present invention discloses a space-bound-free tablet and its coordinate determining circuit for determining a coordinate of a stylus pen. The coordinate is computed by the coordinate determining circuit in which first voltage, a second voltage, and a third voltage is obtained, where the first voltage equals the maximum detection voltage, the second voltage and third voltage are obtained from two antennas, and both of the two antennas are at the same side of the antenna that induces the maximum detection voltage.

6 Claims, 7 Drawing Sheets

TABLET AND COORDINATE COMPUTATION CIRCUIT THEREOF

FIELD OF THE INVENTION

The present invention relates to a tablet, and more particularly, to a space-bound-free tablet and its coordinate computation circuit.

DESCRIPTION OF THE PRIOR ART

Tablet, digitizer, and white board all are similar kind of products; they have two major inputting methods: electromagnetic induction method and touch panel method. The former method typically employs a stylus pen for assisting input of the user.

A typical electromagnetic induction type of tablet may comprise two-dimensional loop antenna array, multiplexers, analog signal amplifiers, band pass filters, rectifiers, integrator, peak-sampling circuit, analog-to-digital circuit, frequency counting circuit, microprocessor, and the like.

Figure 1:
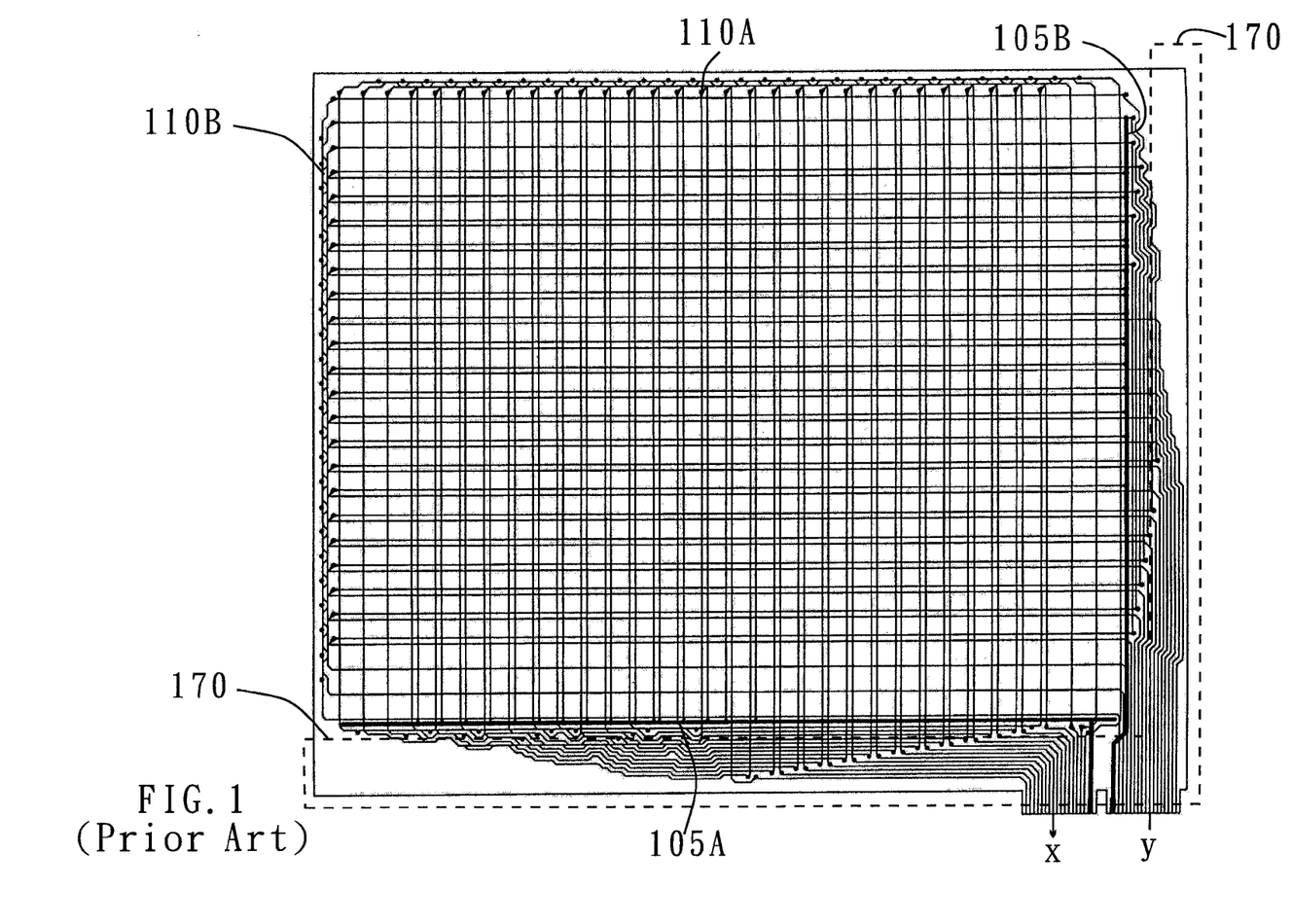
FIG. 1 shows a conventional arrangement of x-y loop antenna array.

A writeable area of the tablet is defined as the surface area of the tablet where the two-dimensional loop antenna array is arranged. For business, the writeable area is better as large as possible. FIG. 1 shows a typical antenna array arrangement in which the a x-coordinate antenna array 110A and a y-coordinate antenna array 110B are respectively connected to a ground line 105A and a ground line 105B, and the x-coordinate antenna array 110A and y-coordinate antenna array 110B are cross through the ground line 105A and ground line 105B respectively, for forming a plurality of pseudo-closing region; hence, the conventional tablet must provide a space-bound area 170 for arranging a portion of each antenna that crosses through the ground line 105A, 105B. Therefore, the writeable area of the tablet is limited, and it is difficult to produce a tablet having small space-bound area or even a space-bound-free area.

Improving the layout design of the loop antenna array may reduce the space-bound area, but the space-bound area is further limited due to the conventional coordinate determining method.

Figure 2:
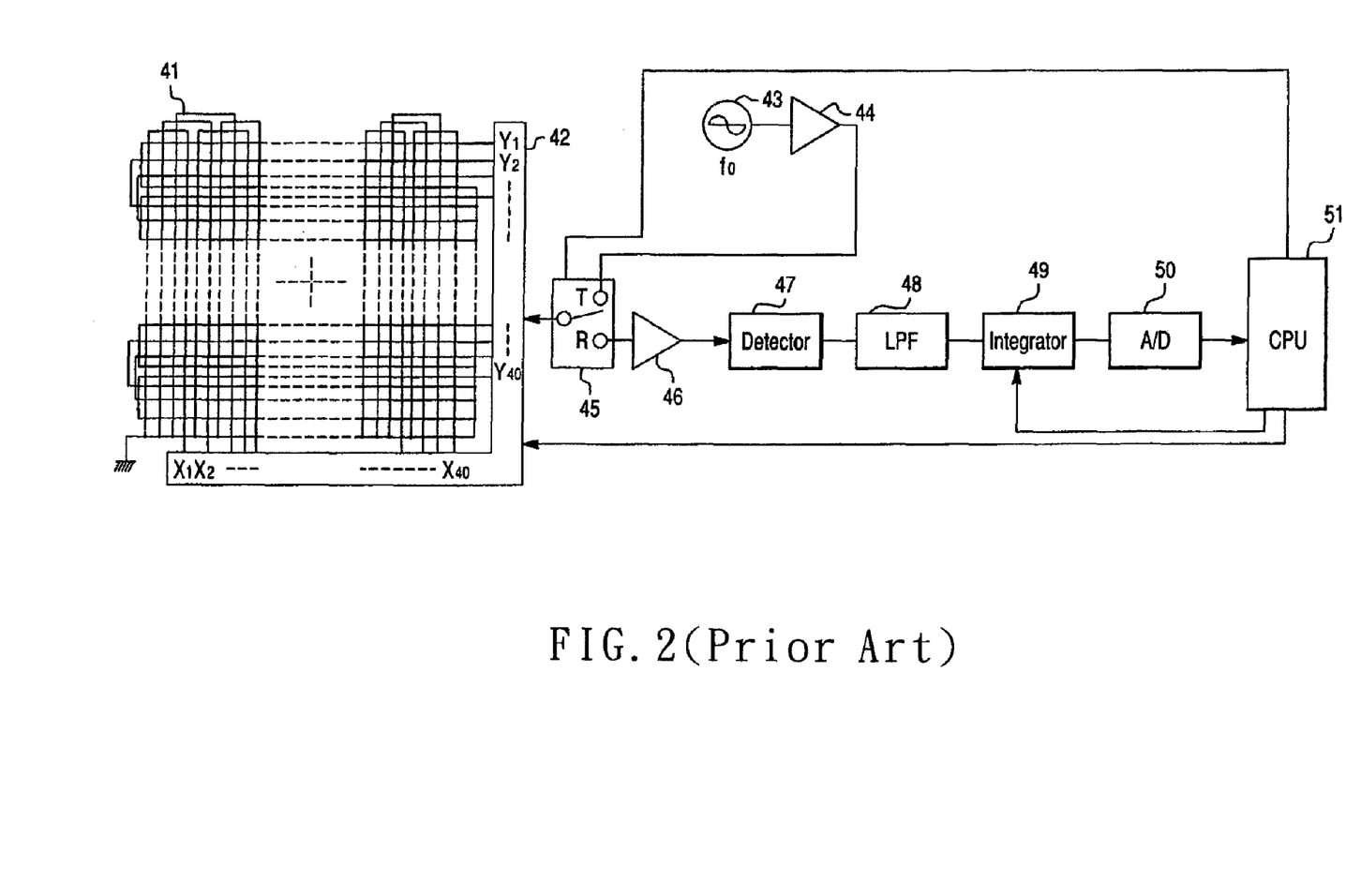
FIG. 2 shows a block diagram of a conventional tablet.

FIG. 2 shows a conventional tablet provided by the U.S. Pat. No. 7,005,843 patent. A loop coil group 41 arranged as X1 to X40 and Y1 to Y40, in an X-axis direction and a Y-axis direction, respectively. These loop coils are connected to a selection circuit 42 for selecting each of the loop coils. An oscillation circuit 43 of a stylus pen (not shown) oscillates at a resonant frequency, which is the same frequency as the frequency $f_0$ of electromagnetic waves transmitted from a tablet. The resonant circuit 43 is connected to the transmission side (T) of a transmission/reception switching circuit 45 via a current driver 44. The transmission/reception switching circuit 45 is connected to the selection circuit 42, and electromagnetic waves at the frequency $f_0$ are emitted from the selected loop coil to the stylus pen. The reception side (R) of the transmission/reception switching circuit 45 is connected to an amplifying circuit 46, which is connected to a detector circuit 47. The detector circuit 47 is connected to a low-pass filter (LPF) 48, which is connected to an integration amplifier 49, and stores and holds reception signals for a specified time. The voltage held by the integration amplifier 49 is outputted to an A/D conversion circuit 50, the output of which is connected to a CPU (central processing unit) 51.

The conventional tablet, for example U.S. Pat. No. 7,005,843, typically employs a double side amplitude method, that is, using the maximum detection voltage, and another two detection voltages obtained from the left side and the right side of the antenna that senses the maximum detection voltage, to determine the coordinate. Because the double side amplitude method limits that the left and right side of the antenna that senses the maximum detection voltage must have antennas arranged, the area of the writeable area is limited. If a tablet is intended to design that the whole surface area are the writeable area, the loop antenna array must be arranged under the whole surface area; however, when the stylus pen is on the edge of the tablet, the coordinate cannot be computed precisely, since the edge lacks an antenna arranged at the left or right side of the antenna that senses the maximum detection voltage.

Besides, the U.S. Pat. No. 7,005,843 patent discloses an integrator to integrate signals of a period of time, to solve the problem the peak value of detection voltages cannot be sampled instantly. However, the noise signals are also integrated, resulting in that the integrated amplitude is not precise even incorrect, or the computed coordinates may fluctuate.

Therefore, it would be advantageous to provide a space-bound-free tablet and its coordinate computation circuit that can overcome the defects of the prior art.

SUMMARY OF THE INVENTION

The object of the present invention is to provide a tablet and its coordinate computation circuit that can overcome the defects of the prior art.

According to the object, the present invention provides a space-bound-free tablet that comprises a stylus pen, a writeable area arranged at the whole surface of the tablet, an x-y loop antenna array arranged inside the writeable area, a switch circuit, a coordinate computation circuit, an analog to digital (A/D) converter; and a microprocessor, where the microprocessor instructs specific antennas of the x-y loop antenna array by switching the switch circuit to detect electromagnetic waves radiated from the stylus pen, the coordinate computation circuit receives detection voltages from the antennas and thus acquires a first voltage, a second voltage, and a third voltage, in which the first voltage equals the maximum detection voltage, the second voltage and the third voltage are obtained from two antennas, and both of the two antennas are arranged at the same side of the antenna that induces the maximum detection voltage; whereby the coordinate computation circuit employs the first voltage, the second voltage, and third voltage to compute a coordinate of the stylus pen, the computed coordinate is transmitted to the analog to digital converter to convert to digital values, and the microprocessor processes the digital coordinate values.

DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components. Wherever possible, the same or similar reference numbers are used in drawings and the description to refer to the same or like parts.

Figure 3:
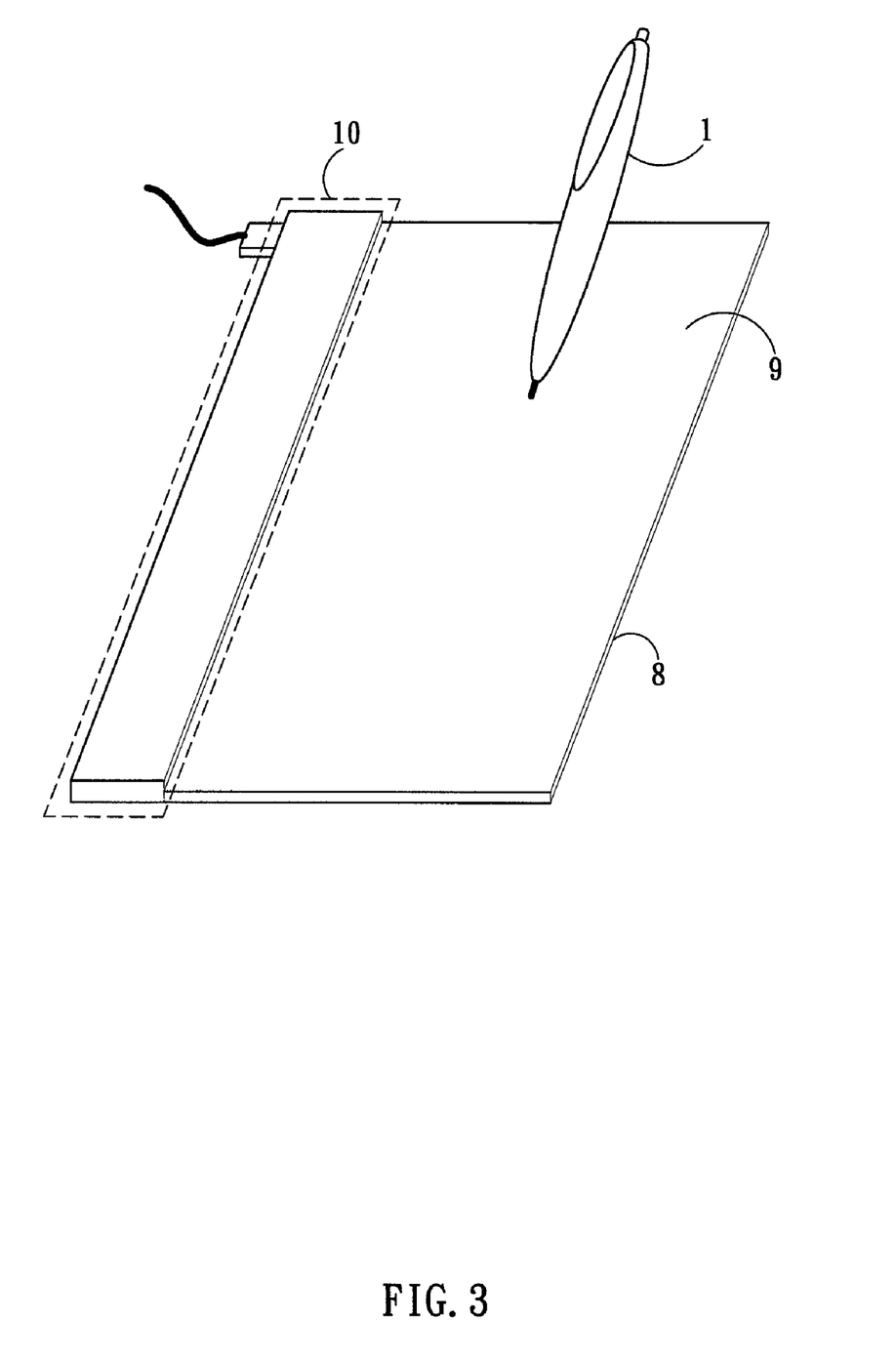
FIG. 3 shows a tablet according to one embodiment of the present invention.

FIG. 3 shows a tablet 8 according to one embodiment of the present invention. A stylus pen 1 is employed for the inputting of the tablet 8. The tablet 8 comprises a writeable area 9 and may further comprise an accessory area 10. An x-y loop antenna array is arranged under the writeable area 9. In the present invention, "tablet" is equivalent to "digitizer", "white board", or other similar kinds of products. The user holds the stylus pen 1 to write or draw on the writeable area 9, and the accessory area 10 provides space to arrange some push buttons, switches, or other components or circuits. In preferred embodiment of the present invention, the accessory area 10 is omitted and the writeable area 9 is arranged at the whole surface area of the tablet 8.

Figure 4:
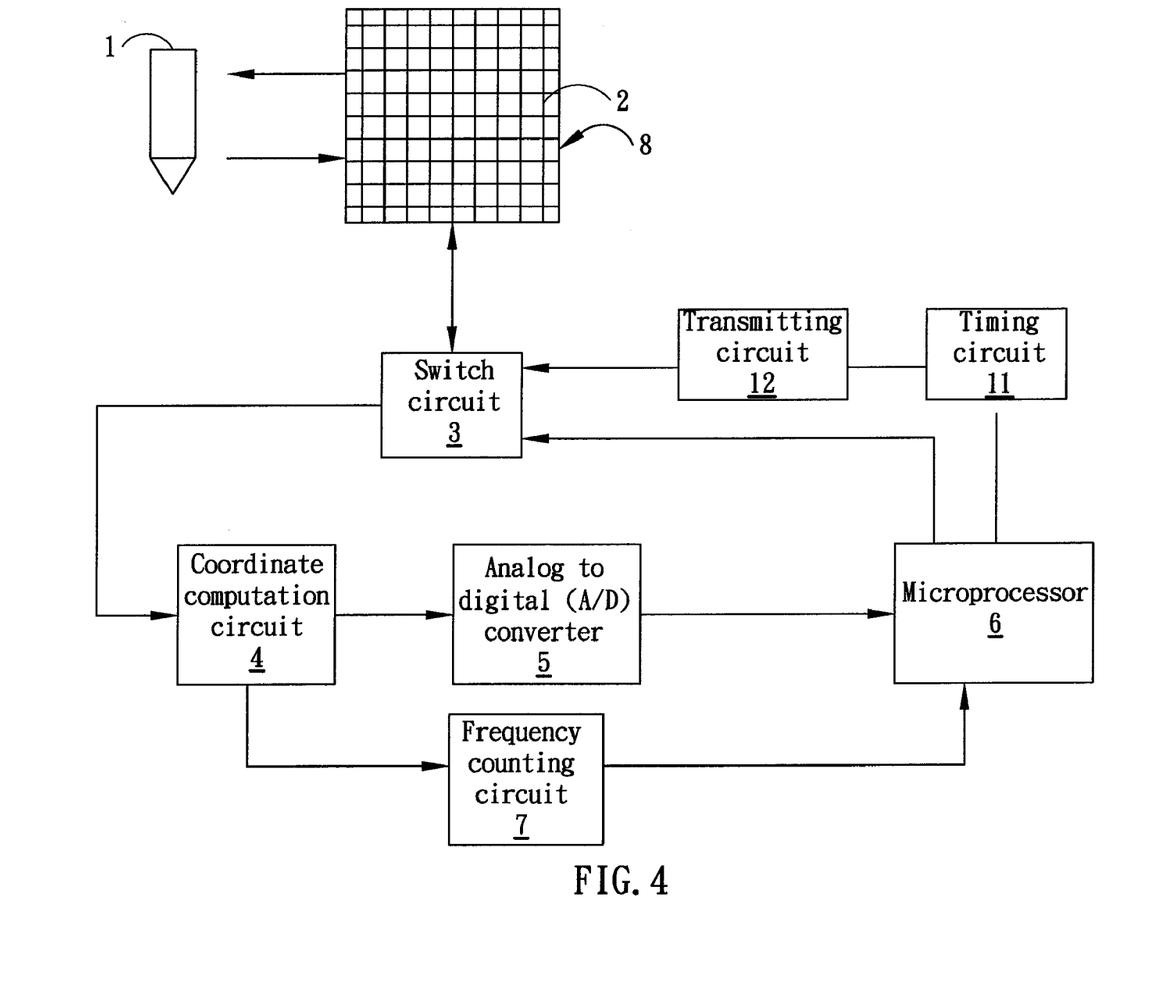
FIG. 4 shows a block diagram of the tablet according to one embodiment of the present invention.

FIG. 4 shows a block diagram of the tablet 8 according to one embodiment of the present invention. An x-y loop antenna array 2 is arranged inside the tablet 8. The tablet 8 further comprises a switch circuit 3, a coordinate computation circuit 4, an analog to digital converter 5, a microprocessor 6, a timing circuit 11, a transmitting circuit 12, and a frequency counting circuit 7. The tablet 8 may comprise other components and the above-mentioned components may comprise filters, amplifiers, rectifiers, or other components.

By switching the switch circuit 3, the microprocessor 6 instructs specific antennas of the x-y loop antenna array 2 to detect electromagnetic wave radiated from the stylus pen 1. The detection voltages from the antennas are transmitted to the coordinate computation circuit 4 to compute the coordinate of the stylus pen 1. The computed coordinates are then transmitted to A/D converter 5 to convert to digital values. The microprocessor 6 processes the digital coordinate values and controls the activities of other components.

In the preferred embodiment of the present invention, the stylus pen 1 is battery less type. According to one embodiment of the present invention, the stylus pen 1 comprises an oscillating circuit consisting of LC (inductors and capacitors). The tablet 8 radiates an electromagnetic wave having frequency that is the same of the frequency of the oscillating circuit, causing a frequency resonance with the oscillating circuit and thus the stylus pen will obtain energy from the electromagnetic wave. On the other hand, a crystal oscillator (not shown) of the tablet provides a clock signal having a higher frequency that is reduced to a lower specific frequency by a frequency divider (not show) of the timing circuit 11. And the transmitting circuit 12 emits out the electromagnetic wave with a larger current, thus providing a larger energy to the stylus pen 1. When the stylus pen 1 obtains the energy of the electromagnetic wave radiated from the tablet 8, the oscillating circuit of the stylus pen 1 radiates an electromagnetic back to the tablet 8.

In addition, the stylus pen 1 may comprises some push buttons or switches arranged on the sidewall or tip portion of the stylus pen 1. When the stylus 1 touches the writeable area of the tablet 8, the inductance of oscillating circuit will be changed and the frequency of the oscillating circuit is varied accordingly. The greater is the pressure of the stylus pen 1 exerted to the surface, the greater is the inductance of oscillating circuit. The greater is the inductance of oscillating circuit, the greater is variance of the frequency of the oscillating circuit. Therefore, the variation of the pressure exerted to the surface on the tablet 8 can be estimated by checking the variation of the frequency of the oscillating circuit. Also, the push buttons are pressed down then recovered, such that vary the capacitance of oscillating circuit, and thus vary the frequency of the oscillating circuit. The frequency counting circuit 7 counts the frequency of the electromagnetic waves received by the coordinate computation circuit 4, and the counted results are transmitted to the microprocessor 6; therefore, the variation of the pressure exerted to the surface of the tablet 8 or the push button or switch that the user pressed can be estimated by the microprocessor 6.

Figure 5:
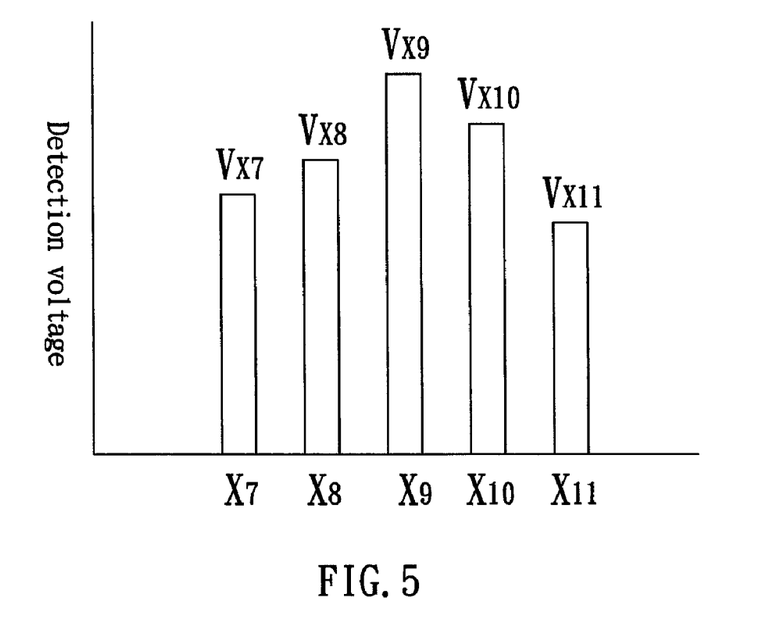
FIG. 5 shows an embodiment of single side amplitude method according to the present invention.

The x-y loop antenna array 2 may be arranged inside the tablet 8 and under the writeable area 9 in a double-faced, arrayed, and equidistant manner. The x-y loop antenna array 11 senses electromagnetic wave radiated from the stylus pen 1. By switching the switch circuit 3, the microprocessor 6 instructs specific antennas of the x-y loop antenna array 2 to detect electromagnetic wave radiated from the stylus pen 1; the nearest antenna will sense the maximum voltage. The coordinate computation circuit 4 comprises a plurality of registers for storing a first voltage, a second voltage, and a third voltage, where the first voltage equals the maximum detection voltage, the second voltage and the third voltage are obtained from two antennas, and both of the two antennas are arranged at the same side of the antenna that induces the maximum detection voltage. For example, FIG. 5 illustrates five antennas $X_7$-$X_{11}$ respectively sense detection voltages $V_{X7}$-$V_{X11}$. When the stylus pen 1 approaches the antenna $X_9$, the rank of the detection voltage of the antennas from high to low might be $V_{X9}$>$V_{X10}$>$V_{X8}$>$V_{X7}$>$V_{X11}$, where the first voltage equals $V_{X9}$, the second voltage equals $V_{X10}$, and third voltage equals $V_{X11}$; or, the first voltage equals $V_{X9}$, the second voltage equals $V_{X8}$, and third voltage equals $V_{X7}$ in another embodiment.

The first, second, third voltages will be employed for computing the coordinate of the stylus pen 1. Because the second, third voltages are obtained from two antennas arranged at the same side of the antenna that sense the maximum detection voltage, this will be suitable for computing the coordinate when the stylus pen 1 is located on the edge of the writeable area 9. In addition, the first, second, third voltages are also suitable for calculating coordinate when the stylus pen 1 is located on the central part of the tablet 8. Therefore, a space-bound-free tablet can be achieved by the coordinate computation circuit 1 that employs the above-mentioned single side amplitude method. In another embodiment of the present invention, the central part and the edge part employs two different coordinate determining methods: the coordinate of the central part is computed by the conventional double side amplitude method, and the coordinate of the edge part is computed by the single side amplitude method of the present invention.

Figure 6:
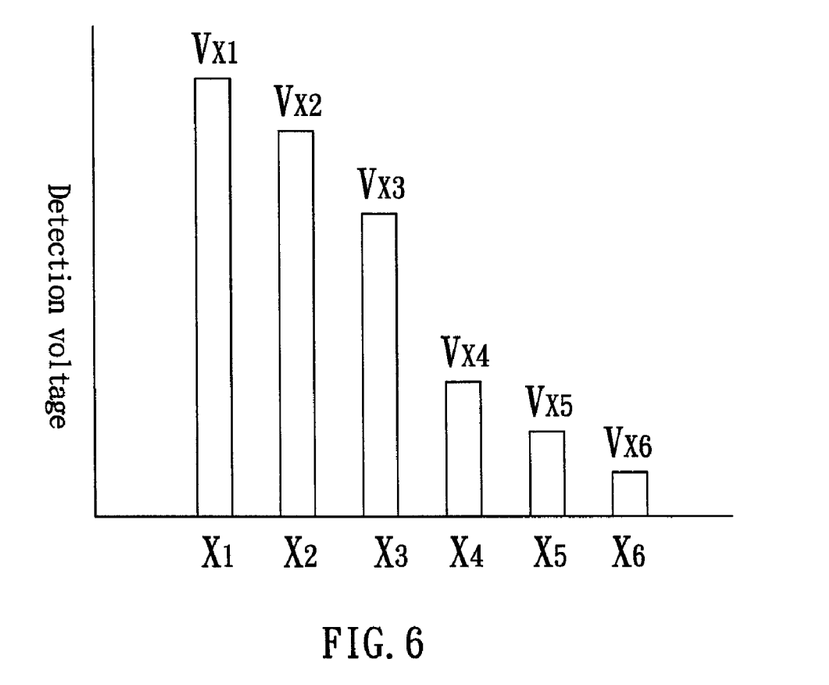
FIG. 6 shows another embodiment of single side amplitude method according to the present invention.

FIG. 6 illustrates an embodiment according to the present invention when the stylus pen 1 is located on the left edge of the writeable area 9. The antenna $X_1$ is the nearest antenna approached to the stylus pen 1; therefore the antenna $X_1$ will sense the maximum detection voltage $V_{X1}$. That is, the first voltage equals $V_{X1}$, the second voltage equals $V_{X2}$, and the third voltage equals $V_{X3}$.

Figure 7:
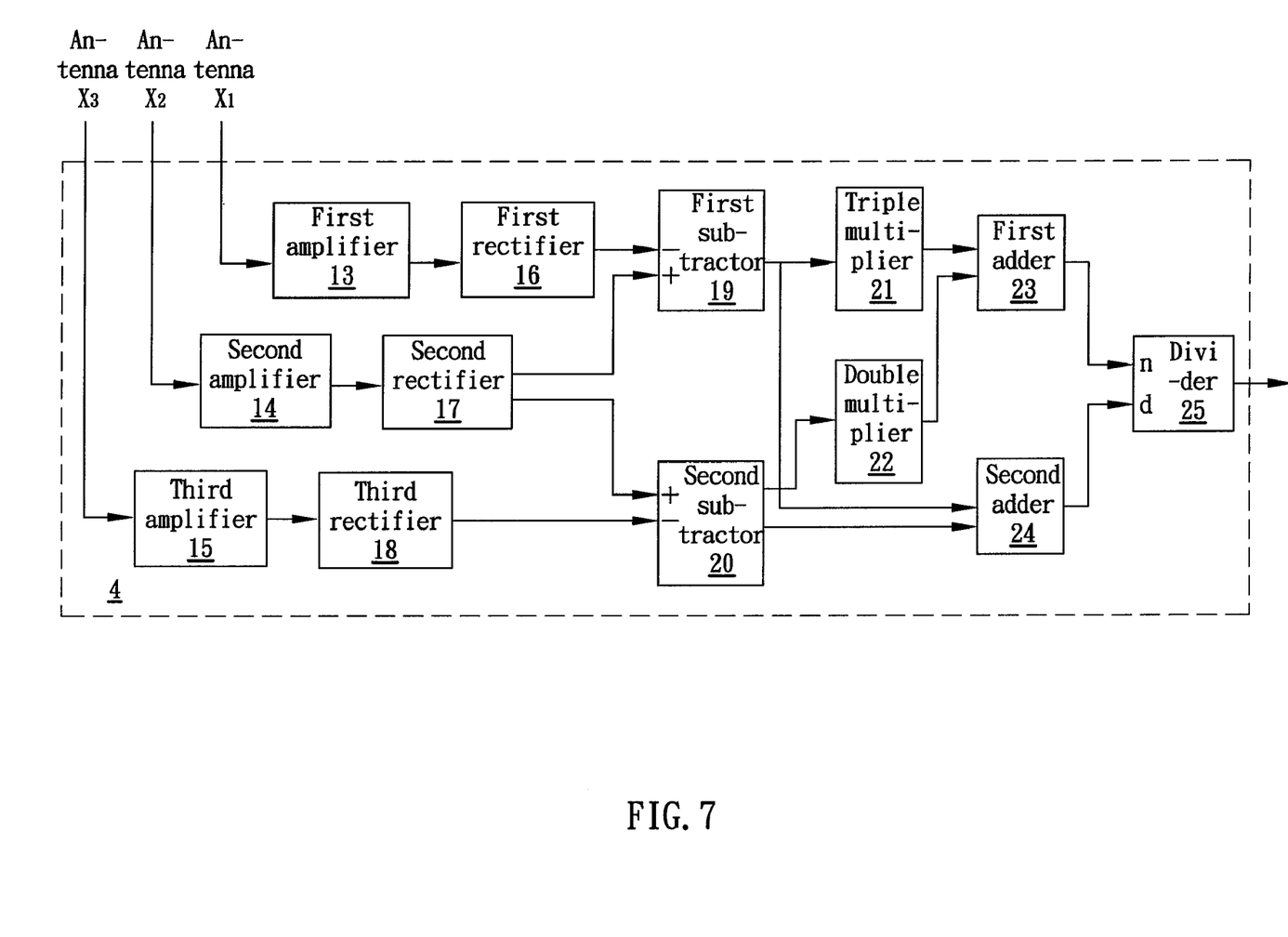
FIG. 7 shows a block diagram of the coordinate computation circuit according to one embodiment of the present invention.

FIG. 7 shows a block diagram of the coordinate computation circuit 4 according to one embodiment of the present invention. Assume the detection voltage of antenna X1 is the first voltage, the detection voltage of antenna X2 is the second voltage, and the detection voltage of antenna X3 is the third voltage. The coordinate computation circuit 4 comprises a first amplifier 13, a second amplifier 14, and a third amplifier 15, for respectively receiving detection voltages of antennas X1-X3 and respectively outputting the detection voltages to a first rectifier 16, a second rectifier 17, and a third rectifier 18. The output terminal of the first rectifier 16 is coupled to the minus terminal of a first subtractor 19. The output terminal of the second rectifier 17 is coupled to the plus terminal of the first subtractor 19 and coupled to the plus terminal of a second subtractor 20. The output terminal of the third rectifier 18 is coupled to the minus terminal of the second subtractor 20. The output terminal of the first subtractor 19 is coupled to a triple multiplier and coupled to a second adder 24. The output terminal of the second subtractor 20 is coupled to a double multiplier 22 and to the second adder 24. The output terminal of the triple multiplier 21 and the output terminal of the double multiplier 22 are coupled to a first adder 23. The output terminal of the first adder 23 is coupled to the numerator terminal of a divider 25. The output terminal of the second adder 24 is coupled to the denominator terminal of the divider 25. The output terminal of the divider 23 is coupled to the A/D converter 5, and the coordinate can be therefore computed. The coordinate computation circuit 4 not only computes the x-coordinate but also computes the y-coordinate of the stylus pen 1, according the same circuits mentioned above.

Figure 8:
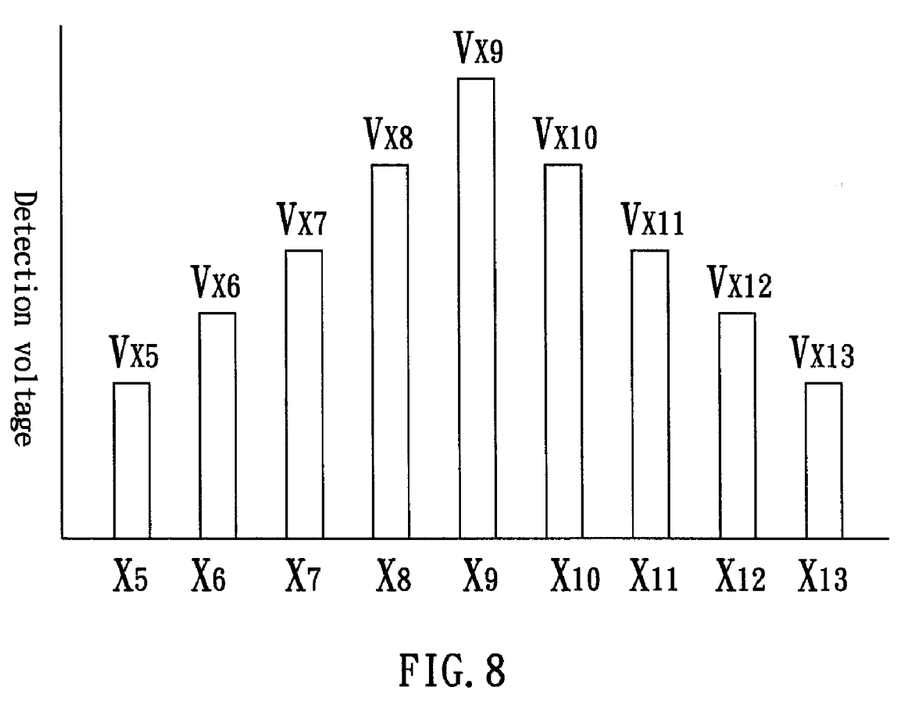
FIG. 8 shows another embodiment of single side amplitude method according to the present invention.

According to the present invention, the second and third voltages are obtained from two antennas arranged at the same side of the antenna that senses the maximum detection voltage. In addition, the two antennas may not be limited to the nearest antennas of the antenna that senses the maximum detection voltage. FIG. 8 illustrates another embodiment according to the present invention, where nine antennas $X_5$-$X_{13}$ sense nine detection voltages $V_{X5}$-$V_{X13}$. The embodiment of FIG. 8 differs from embodiment of FIG. 5 at least in that the pitch between two antennas is different. When the stylus pen 1 approaches the antenna $X_9$, the antenna $X_9$ will sense the maximum detection voltage, that is, the first voltage equals $V_{X9}$. The second voltage may be obtained from antenna $X_{11}$, i.e., $V_{X11}$. The third voltage may be obtained from antenna $X_{13}$, i.e., $V_{X13}$. In another embodiment, similarly, the first voltage equals $V_{X9}$, the second voltage equal $V_{X7}$, and the third voltage equals $V_{X5}$. According to the same coordinate computation circuit 4 mentioned above, the X and Y coordinates of the stylus pen 1 can be computed.

According to the present invention, the coordinate computation circuit 4 is employed for acquiring the first voltage, the second voltage, and the third voltage. A noise-judge value may be stored in the coordinate computation circuit 4 for distinguishing whether the detection voltages is noise or not. The noise-judge value may be defined as the maximum voltage detected by the x-y loop antenna array 2 when the tablet 8 is free of the stylus pen 1 thereon. The microprocessor 6 therefore judges that the stylus pen 1 is approaching if the amplitude of the one or more of the received detection voltages is greater than the amplitude of the noise-judge value. After a sequence of comparison procedure, the first voltage, the second voltage, and the third voltage can be obtained and stored in the plurality of registers of the coordinate computation circuit 4.

The present invention has at least three advantages compared to the conventional tablets. First, because the coordinate computation circuit 4 employs a single side amplitude method for determining the coordinates, some additional loop antennas arranged outside the writeable area is needless; therefore a space-bound-free tablet can be achieved. Second, because the coordinate computation circuit 4 omits the conventional integrator, the effects of noise are cancelled, the coordinate is precisely computed, and the fluctuation will not occur in the computed coordinates. Third, the microprocessor 6 is not responsible for calculating the coordinates, but only responsible for displaying the coordinates according the resolution of the screen. Therefore the time of computing coordinates can be saved, and thus the response time of outputting coordinates for display can be shorter.

Although specific embodiments have been illustrated and described, it will be appreciated by those skilled in the art that various modifications may be made without departing from the scope of the present invention, which is intended to be limited solely by the appended claims.

What is claimed is:
1. A tablet, comprising:
a stylus pen;
a writeable area arranged at the whole surface of said tablet;
an x-y loop antenna array arranged inside said writeable area;
a switch circuit;
a coordinate computation circuit;
an analog to digital (A/D) converter, wherein the coordinate computation circuit comprises a first amplifier, a second amplifier, and a third amplifier for respectively receiving detection voltages and respectively outputting the detection voltages to a first rectifier, a second rectifier, and a third rectifier, wherein the output terminal of the first rectifier is coupled to the minus terminal of a first subtractor, the output terminal of the second rectifier is coupled to the plus terminal of the first subtractor and coupled to the plus terminal of a second subtractor, the output terminal of the third rectifier is coupled to the minus terminal of the second subtractor, the output terminal of the first subtractor is coupled to a triple multiplier and coupled to a second adder, the output terminal of the second subtractor is coupled to a double multiplier and is coupled to the second adder, the output terminal of the triple multiplier and the output terminal of the double multiplier is coupled to a first adder, the output terminal of the first adder is coupled to the numerator terminal of a divider, the output terminal of the second adder is coupled to the denominator terminal of the divider, and the output terminal of the divider is coupled to the analog to digital converter; and
a microprocessor;
wherein said microprocessor instructs specific antennas of said x-y loop antenna array by switching said switch circuit to detect electromagnetic waves radiated from said stylus pen, said coordinate computation circuit receives detection voltages from the antennas and thus acquires a first voltage, a second voltage, and a third voltage, in which the first voltage equals the maximum detection voltage, the second voltage is obtained by an antenna that is the next antenna to the antenna that senses the first voltage, and the third voltage is obtained by an antenna that is the next antenna to the antenna that senses the second voltage; whereby said coordinate computation circuit employs the first voltage, the second voltage, and third voltage to compute a coordinate of the stylus pen, the computed coordinate is transmitted to said ana- log to digital converter to convert to digital values, and said microprocessor processes the digital coordinate values.

2. The tablet as claimed in claim 1, wherein the surface of said tablet further comprises an accessory area near by said writeable area for arranging a plurality of push buttons, switches, or other components.

3. The tablet as claimed in claim 1, wherein said stylus pen is battery less type of stylus pen.

4. The tablet as claimed in claim 3, further comprising a timing circuit and a transmitting circuit, wherein an electromagnetic wave having a higher frequency is reduced to a specific frequency by the timing circuit, and the transmitting circuit transmits out the electromagnetic wave with a larger current.

5. The tablet as claimed in claim 3, further comprising a frequency counting circuit for counting the frequency of the electromagnetic waves received by said coordinate computation circuit, said microprocessor estimating the pressure exerted to the surface of the tablet or the push button or switch that the user pressed according to the counted frequency.

6. The tablet as claimed in claim 1, wherein the tablet comprises a digitizer or a white board.

* * * * *